United States Patent
Day et al.

(10) Patent No.: US 10,249,114 B2
(45) Date of Patent: Apr. 2, 2019

(54) SYSTEM AND METHOD FOR ACCESS CONTROL USING CONTEXT-BASED PROOF

(71) Applicant: Guardtime IP Holdings Limited, Tortola (VG)

(72) Inventors: Garrett Day, Arlington, VA (US); Jeffrey Pearce, Hilo, HI (US); David E Hamilton, Jr., Seaford, DE (US); Kevin Zawicki, Falls Church, VA (US); Roger Guseman, Mineral, VA (US)

(73) Assignee: Guardtime IP Holdings Limited, Tortola (VG)

( * ) Notice: Subject to any disclaimer, the term of this patent is extended or adjusted under 35 U.S.C. 154(b) by 0 days.

(21) Appl. No.: 15/857,655

(22) Filed: Dec. 29, 2017

(65) Prior Publication Data

US 2018/0144565 A1    May 24, 2018

Related U.S. Application Data

(63) Continuation of application No. 15/091,587, filed on Apr. 6, 2016, now abandoned.

(51) Int. Cl.
*H04L 29/06* (2006.01)
*G07C 9/00* (2006.01)
(Continued)

(52) U.S. Cl.
CPC .......... *G07C 9/00111* (2013.01); *G06F 21/32* (2013.01); *G06F 21/6209* (2013.01); *G07C 9/00103* (2013.01); *G07C 9/00309* (2013.01); *H04L 9/0836* (2013.01); *H04L 9/3239* (2013.01); *H04L 9/3247* (2013.01); *H04L 63/08* (2013.01); *H04L 63/10* (2013.01);
(Continued)

(58) Field of Classification Search
CPC ........... H04W 4/04; H04W 4/00; H04W 4/02; H04W 12/06; G07C 9/00; G01C 21/20; H04L 9/32; H04N 21/60
USPC ............... 340/5.21; 713/173, 156, 171, 175; 705/59
See application file for complete search history.

(56) References Cited

U.S. PATENT DOCUMENTS 6,167,518 A * 12/2000 Padgett .................. G06F 21/32
380/285
6,691,231 B1 * 2/2004 Lloyd ................. H04L 63/0428
713/164

(Continued)

*Primary Examiner* — Nam V Nguyen
(74) *Attorney, Agent, or Firm* — Jeffrey Pearce

(57) ABSTRACT

Control of access by a requesting entity to an asset includes defining an approved state of the requesting entity. A validation of a representation of the approved state of in a non-repudiatable form in obtained from an event validation system. The requesting entity is triggered to determine its current state by an access-control entity, which compares the current state with the approved state and allows access by the requesting entity to the asset only if the current state is the same as the approved state. In a pre-authorization procedure, one or both of the entities issues a data set challenge to the other, which then validates the challenge via the event validation system and returns this validation to the challenging entity, which then checks the validation to see if it is correct. Data sets may be validated, for example, with hash tree based signatures or blockchain entries.

33 Claims, 8 Drawing Sheets

(51) Int. Cl.
  *H04W 12/06* (2009.01)
  *H04L 9/32* (2006.01)
  *G06F 21/32* (2013.01)
  *G06F 21/62* (2013.01)
  *H04W 12/08* (2009.01)
  *H04L 9/08* (2006.01)

(52) U.S. Cl.
  CPC ........... *H04L 63/123* (2013.01); *H04W 12/08* (2013.01); *G06F 2221/2103* (2013.01); *G07C 2009/00388* (2013.01); *H04L 63/107* (2013.01); *H04L 2209/38* (2013.01)

(56) References Cited

U.S. PATENT DOCUMENTS

| | | | |
|---|---|---|---|
| 7,012,503 B2* | 3/2006 | Nielsen | G07C 9/00103 340/5.6 |
| 8,015,409 B2* | 9/2011 | Wilkinson, Jr. | H04L 63/0823 705/59 |
| 8,466,773 B2* | 6/2013 | Willgert | G06F 21/35 340/425.1 |
| 8,973,108 B1* | 3/2015 | Roth | G06F 21/00 726/1 |
| 9,058,702 B2* | 6/2015 | Chao | G07C 9/00111 |
| 9,350,735 B1* | 5/2016 | Parmar | H04L 63/10 |
| 9,443,365 B2* | 9/2016 | Ahearn | G07C 9/00309 |
| 9,524,601 B1* | 12/2016 | Dumas | G07C 9/00309 |
| 9,542,542 B2* | 1/2017 | Giobbi | G06F 21/31 |
| 9,558,363 B2* | 1/2017 | Whalley | G06F 21/6245 |
| 9,558,604 B2* | 1/2017 | Robertson | G07C 9/00007 |
| 2003/0236985 A1* | 12/2003 | Ruuth | G06F 21/35 713/173 |
| 2004/0139028 A1* | 7/2004 | Fishman | G06Q 20/341 705/67 |
| 2011/0131661 A1* | 6/2011 | Valls Fontanals | G06F 21/6254 726/26 |
| 2014/0143149 A1* | 5/2014 | Aissi | G06F 21/31 705/44 |
| 2015/0281279 A1* | 10/2015 | Smith | H04L 63/20 726/1 |

* cited by examiner

SYSTEM AND METHOD FOR ACCESS CONTROL USING CONTEXT-BASED PROOF

CROSS-REFERENCE TO RELATED APPLICATIONS

This application claims priority of and is a Continuation of U.S. patent application Ser. No. 15/091,587, filed 6 Apr. 2016, which issued as U.S. Pat. No. 10,068,397 on 4 Sep. 2018.

FIELD OF THE INVENTION

This invention relates to controlling the access of persons, things and other entities to facilities and other environments, both physical and logical.

BACKGROUND

Controlling access to environments has been important ever since the first lock was installed in a door; moreover, once an individual has entered a controlled environment, making sure he goes only where he's authorized has historically required additional locks and keys, or some kind of guards/gatekeepers. These problems are essentially the same even in the age of computers, although the technology used not only to solve them but also to defeat the safeguards has become more sophisticated.

One common way to control access to a building is to require individuals to use an access card, such as an ID badge, which the user holds up to a scanner or shows to a guard. For more security, some systems also require the user to enter a password and/or "PIN" and/or pass a verification of a biometric feature such as a fingerprint or retina scan. For example, currently, access to a secure government facility sometimes requires an RFID-based ID "Common Access Card" CAC card (for example) and a 4 digit PIN.

One problem with existing arrangements is that, even if security through an initial portal is deemed sufficient, it becomes complicated—or at best repetitive—to monitor access once an individual passes the first check. For example, the badge/password/PIN procedure, or some portion of it, may have to be repeated to permit entry through a chain of doors that lead to a room where a piece of client equipment can be used to access a secure network. In a more sophisticated arrangement, a security person may be able to track down what access portals a particular badge has crossed, but that is typically the extent of the monitoring.

Smart mobile technology, including phones, tablets, etc., presents both challenges and opportunities in the context of access control. Because most such devices can record both images and sounds, load and store data, as well as access (or at least detect some of the possibly classified characteristics of) networks, many secure facilities simply forbid users from bringing them in. This is inconvenient for most modern users, and also fails to leverage the capabilities of such devices.

One proposed idea for using smart mobile technology in a secure environment is described by Souppaya, Murugiah, et al., in "Derived Personal Identity Verification (PIV) Credentials" (draft), Information Technology Laboratory, National Institute of Standards and Technology (NIST), 18 Jun. 2015. Souppaya, et al., propose a scheme that employs tokens on mobile devices, such that derived PIV credentials and their corresponding private keys may be used. Solutions such as Souppaya's focus on verifying the identity of the device user, but fail to provide any mechanism to authenticate the user's device itself. First, what if the mobile device user himself is a threat and, after having his identity properly verified, proceeds to use his mobile device in an unauthorized manner, such as to store classified information that he then removes from the facility, or to be the medium that carries malicious code he then installs on the secure system? Second, without the user's knowledge, the mobile device itself may contain and be executing code, for example, to capture network data or voice conversations, to record video or other images, etc. In short, just because the user's identity is verified doesn't mean that the mobile device he takes into a secured facility is safe.

One other common method of access control uses a dongle, which generates a time-dependent code that must match the code the higher level system expects. Sometimes, a password and card that carries a smart chip, or both, is required just to operate the dongle. One drawback of such systems is that they require a complicated infrastructure to procure, program, and distribute the dongles themselves, but also to ensure precisely coordinated timing. Furthermore, dongle-based solutions rely on a comparison of secrets, in particular, any passwords, and the dongle-generated codes.

DETAILED DESCRIPTION

In broad terms, embodiments of this invention involve systems and operational methods that implement a secure protocol to authenticate a requesting entity in a secured or otherwise defined, controlled environment, using an optional two-way challenge and response mechanism in conjunction with widely witnessed or at least irrefutable context confirmation. Embodiments will be described below primarily with reference to one use case, in which the requesting entity is a mobile device such as a smart phone, tablet computer, etc., that is associated with a user and the secured environment is a secure facility the user wishes to access. There are many other use cases, however, and different types of requesting entities. For example, the requesting entity need not be associated with a user at all, and the invention may be used in environments that don't involve facility security. As just one possible example, the requesting entity might be a tracking device attached to a product moving through a production facility or supply chain. The requesting entity could even be logical, for example a virtual machine, that an administrator wants to migrate into a controlled computing environment. In one embodiment described below, the requesting entity is itself "logical", that is, a body of executable code, such as a browser. In other words, embodiments range from those in which the requesting entity is mostly a hardware device, such as a mobile phone, tablet computer, etc., to those in which the requesting entity is essentially all computer code. The examples below are therefore just that: non-limiting examples. For the sake of succinctness, the requesting entity (one or more) is generally referred to below as the "requestor" 2000.

Figure 1:
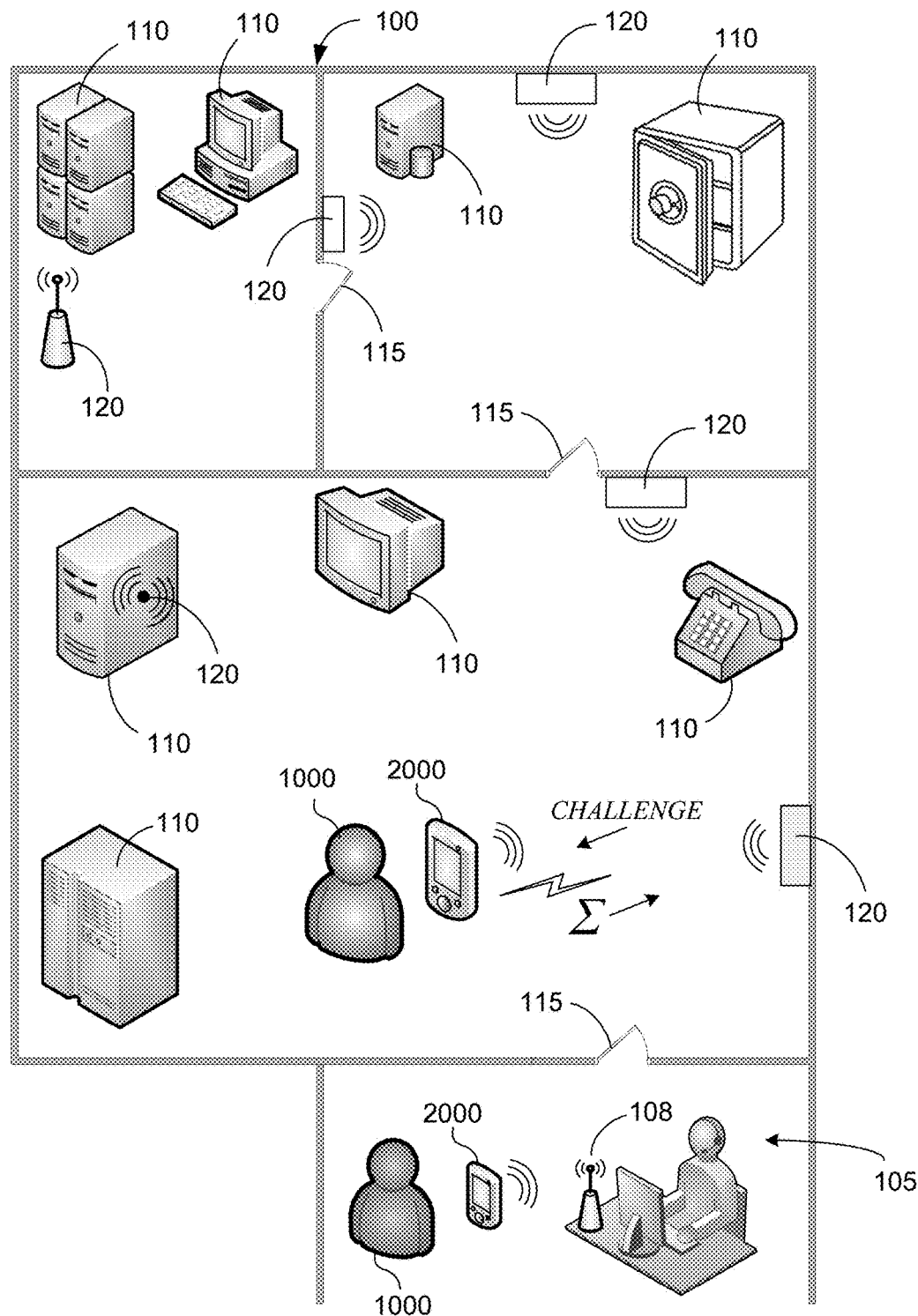
FIG. 1 illustrates an example of one environment in which embodiments of the invention may be used to control access.

FIG. 1 illustrates a secure facility 100, which has an initial access point 105, a variety of assets 110 such as computers, a phone, and a safe, located in different rooms entered through doors 115. Note that the interior of some defined physical or logical space may itself constitute an asset. A user 1000 is shown (in two locations) with a requestor 2000 in the form of a mobile device, which is able to communicate externally in any known manner, such as via wifi, Bluetooth, NFC (Near-Field Communication), the telephone network, using optically or audibly readable display (such as by generating and displaying QR or similar markings) or any combination of these.

In the illustrated example, the user 1000 starts at the initial access point 105, where his identity may be verified using any known method, such as using biometric (for example, fingerprint, retinal, voice) scanning, entering a password, etc., or any combination of such methods.

At the initial access point, an approved, initial state S0 of the requestor/device 2000 is established at time t0. This state is then made "non-repudiatable", that is, "sealed", in the sense that it is represented and stored in a manner that enables later detection of any change. In some embodiments, this is done by incorporating a representation of the state S0 as part of some widely witnessed event, or in some other manner that cannot be repudiated. In other embodiments, the state S0 is digitally signed in such a way that the signature itself enables non-repudiation, and may itself possibly be included in a different system as a non-repudiatable event. An event validation system 5000 is therefore either included as part of the access control system itself, or is external and can be accessed by it, and establishes and maintains the non-repudiatable event. In one embodiment described below, it is assumed by way of example, that the non-repudiatable event for the state S0 is a digital signature; later in this description, a preferred and advantageous signature scheme is explained. Depending on the event validation system used, the feature of "non-repudiation" may involve conclusively establishing the fact that a particular entity has successfully accessed the system, such as by participating in a validation event; this may be instead of, or in addition to, establishing provably that a data set such as a representation of the initial state S0 has not changed.

The approved state S0 may be defined in any desired manner to include such input values/parameters as, for example, a digital representation (such as a hash) of what software is loaded and/or running in the device, along with any chosen metadata (such as version number), the state and contents of memory and/or storage devices, the type and status of I/O devices, identifiers of the hardware, indications of policy settings, and any other chosen information that is to be assumed as remaining invariant, at least for some authorization time. Note that, in the cases where the requestor is a digital asset, that is, a logical entity, such as a virtual machine or other body of executable code, all or some predetermined part of its software and its hardware representation may be defined to constitute its approved, initial state S0.

As for the signature, either the various input values as a block can be signed, or sub-sets of them can be signed, with the signatures then themselves being, for example, concat-enated and signed to create a collective signature. Depending on the chosen signature scheme, it will generally be more efficient for the various input values to be processed into one, or at most a few, values that form the actual input record that is signed. For example, rather than signing individual input values, it will in general reduce the processing time and bandwidth required to first compile the different values and reduce them to a single (or only a small number of) value that comprises the input record that is signed. For example, rather than individually signing {input_data_set_1}, {input_data_set_2}, . . . , {input_data_set_n}, {parameter_1}, {parameter_2}, . . . , {parameter_m}, the system may instead, for example, concatenate these and compute a single hash value representing them all. One other advantage of this scheme is that the actual data need not be transmitted outside the device.

Even user-dependent parameters could be included as part of the approved state S0. For example, biometric scanning establishes an initial and invariant data set that defines such characteristics as a fingerprint or retinal or voice pattern, and then, for later verification, compares a different scan of the same characteristic(s) to determine if the re-captured data set, using any predetermined measure, is close enough the stored, initial data set that the system can assume a "match". The invariant reference data may thus be made part of the approved initial state.

Other data that is not necessarily related to the state of computer hardware or software may also form part of the initial state, depending on the implementation. For example, assume that a manufactured product, a shipping container, etc., is to move through stages of a supply chain. Data identifying, for example, the manufacturer, the product serial number, relevant dates and times, routing, etc., might also be included as parameters in S0, encoded in a device attached to or otherwise associated with the item.

If the approved state is sealed by a digital signature, the signature scheme chosen should be such that it can be used to determine any change in the state of the device. Let $\Sigma i=\Sigma(Si)$ be the signature of the state Si, at time ti of the requestor. The signature scheme should be chosen such that $\Sigma i=\Sigma j$ if $Si=Sj$. In other words, two signatures should be identical only if the data sets they are signatures of are exactly identical. In the context of this example, the important point is that, if the set of input parameters used to generate $\Sigma 0$ are later submitted for re-signature, then any change in the parameters should lead to a signature $\Sigma 0 \neq \Sigma 0$.

The initial signature $\Sigma 0$ may be obtained at the access point 105 in different ways. For example, it would be possible for the device 2000 to be pre-authorized, with a known signed initial state and a security agent 2100 (see below) pre-installed, and given to the user, either for use only within the secure facility 100 or otherwise. With the agent installed into the user's own device, or one otherwise not pre-configured, the initial state of the device or other requestor could be detected in any of several ways. For example, the state parameters could be transmitted wirelessly, under control of the agent, via a router or other sensor 108, or by plugging the device or its SD or other card into a suitable reader or port and being scanned by an external routine, for example, within an administrative computer at the initial access point.

Now assume that the mobile device has been approved to be taken into the secure facility 100, and that its initial state S0 and corresponding signature $\Sigma 0$ are registered within, for example, a server or computer that administers the facility's security policy. Assume also that the user has entered within the secure area, that is, has passed through the door at the initial access point. In some implementations, there may be a requirement for the mobile device to maintain wifi connection with the administrative system whenever it is within the secure facility 100. In other implementations, however, this is not necessary, as long as the device communicates with the administrative system to receive and respond to challenges, as explained below.

One or more challenge-response units 120 are positioned in the secure area. On a schedule, or when the mobile device 2000 comes within range of, for example, an NFC, RFID or other sensor that's part of the units 120, or upon user initiation, such as requesting entry through another door, or any combination of these or other possible triggering events, at least one of the units issues a challenge to the device 2000. Upon receiving the challenge, the mobile device, in particular, the agent installed in it, collects the data set corresponding to the one used to generate the initial signature $\Sigma 0$ and formats it into the form used to obtain the initial signature, that is, into an input record in the format used to obtain the initial signature. The device may then transmit this input record to the challenging unit, whereupon the background security system, using the device's signature $\Sigma 0$, may confirm whether the submitted input record is identical to the one used to create $\Sigma 0$. In short, at the time ti of each challenge, the administrative security system that caused the challenge to be issued will verify that the device state Si is unchanged relative to the initial state S0.

The administrative system may obtain the signature $\Sigma 0$ for each device 2000 in different ways. At the time of registration, the administrative system may store the ID of the device along with the signature $\Sigma 0$. If the response to a challenge includes the ID of the device, then the administrative system may simply look up the corresponding signature $\Sigma 0$ internally. One advantage of this is that it would not be necessary to store the signature $\Sigma 0$ within the device itself, such that it would not be accessible to a hacker. If the signature scheme is chosen to be keyless (the preferred example is discussed below), then the device would not need to store the signature $\Sigma 0$, any keys, or any other "secrets" (such as passwords) that a malicious actor could access.

It would also be possible to include as part of the initial state a "nonce", that is, a one-time value generated by the administrative system, which, depending on the signature scheme, may effectively randomize the signature even if all other state information is the same. Moreover, at the time of registration, the administrative system could also send to the agent in the device one or more parameters that indicate which bodies of data within the device are to be included in the initial state vector S0, which will also be used to generate the state value Si upon challenge. For example, rather than hashing all of the memory space corresponding to authorized applications, it would be possible to hash a randomly selected sub-set, such that a hacker would not know from time to time even what he would need to include in a faked response.

It is not necessary for the challenge-response procedure to be done totally wirelessly. As just one example of an alternative, the challenge-response procedure could be triggered from within the device itself, such as on a schedule that is set and followed by the agent. For example, the user could be prompted by the device in any known way, including audible, visual (flashing screen or indicator light, for example) or tactilely (vibration) to approach a unit 120, which could include a QR or similar code reader. Assuming the response does not require more bits than the optical symbol, such as the QR code) can encode, the user may then place the display of the device 2000 on the corresponding reader to respond to the challenge. The administrative system may then decode the optical symbol and attempt to verify its contents based on the initial signature. If verified, the device could be authorized for access for an additional time period, or for some other action, such as authorization to proceed to one or more subsequent points or stages in the controlled environment.

Depending on which data sets and parameters are defined as being part of the initial state S0, and thus form the basis of the initial signature $\Sigma 0$, what this means is that if any of the data sets or parameters has been changed in any way since t0, then signature verification will fail and the administrative security system will be alerted to take whatever action is planned. Such actions may range from the "mild" and delayed, such as the failure event simply being logged, with the user being required to hand over his device for later analysis, or the phone being "locked" until unlocked by the administrator, or may be "strict", such as the administrative system signaling the agent within the device to erase information, up to and including causing the device to execute the routine normally included in such devices to do a total factory reset, or to cause the installed agent to erase portions of memory, disable one or more applications, turn off one or more hardware-based facilities such as wifi or other wireless systems.

When the requestor 2000 is validated at the initial access point, or at any other time before the initial state is established, it is also possible to include in the approved, initial state S0 indications of allowed settings. In a mobile device, "Camera=OFF", "Microphone=DISABLED", "Email/SMS=RECEIVE ONLY" are just three possible examples of such settings, which the agent may then check for as part of the challenge-response procedure.

Depending on how the units 120 are positioned, what technology is used for wireless communication, and what its signal range is, note that the challenge-response procedure outlined above also provides positional tracking of the device 2000 within the facility 100. As such, positional control may also be implemented. For example, during registration, part of the initial state could be indications of which rooms or areas the device is allowed to be in, or even must respond to.

If the requestor includes a precise enough geolocation facility, such as GPS, then part of the approved initial state could be an approved geographic location that the device may be allowed to operate in, or may be prohibited from operating in. For example, the state S0 could be defined to include a center and radius, thereby defining an allowed or prohibited circular area. Another example would be to include an absolute or relative signal strength from one or more transmitters, such as from the challenge-response units 120, from cellular telephone towers, from beacons, etc., such that the responder is not able to respond correctly to a challenge if the signal strength(s) fall below (or above) some threshold or outside of some approved range.

The authorized initial state may also include logical boundaries. For example, the requestor could be loaded with a whitelist and/or blacklist of URLs that may/may not be accessed while the requestor is in the secure area. Similarly, any connection to a VPN could be either required or prohibited.

The initial registration phase of the requestor, and establishment of the approved state S0, may be all that is needed in some implementations and environments. In others, however, additional security may be included. For example, it may be desired to assure the user, or simply the requestor, that the administrative system controlling access is in fact the right one, and has not been spoofed or subjected to a man-in-the-middle attack. For example, in one possible use case the requestor is a navigation system, such as a GPS receiver and processor, or the updating system of a submarine's inertial navigation system, whereas the validating system is one or more satellites or other transmitters in the navigation constellation. How can the receiver/processor know that the transmissions it is receiving haven't been spoofed? Similar issues might arise in the use case in which the device is a vehicle, including a manned or unmanned aircraft that must be cleared for entry into a secure environment such as a particular airspace.

Figure 2A:
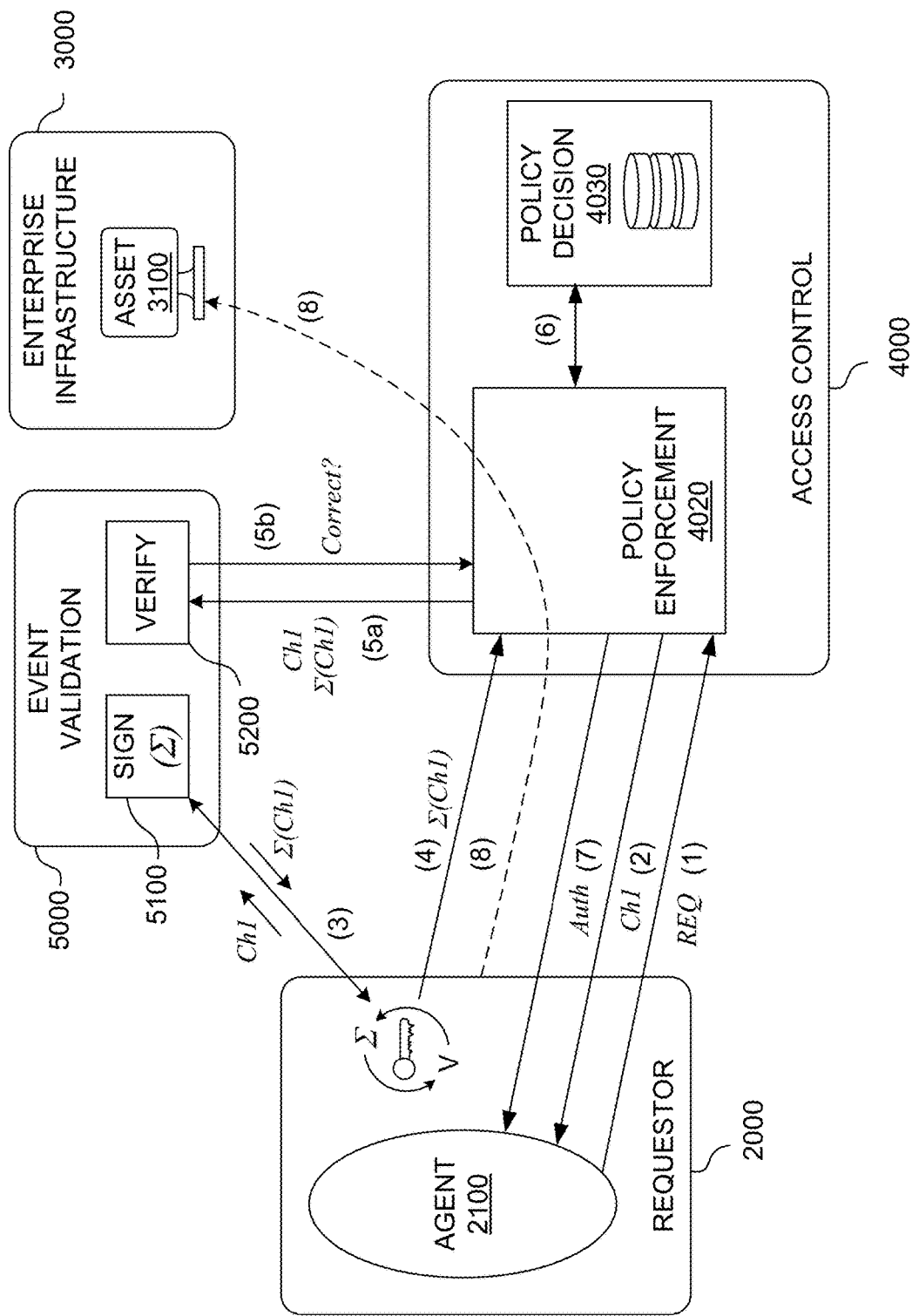
FIG. 2A illustrates a client authorization phase of an asset access request procedure.
Figure 2B:
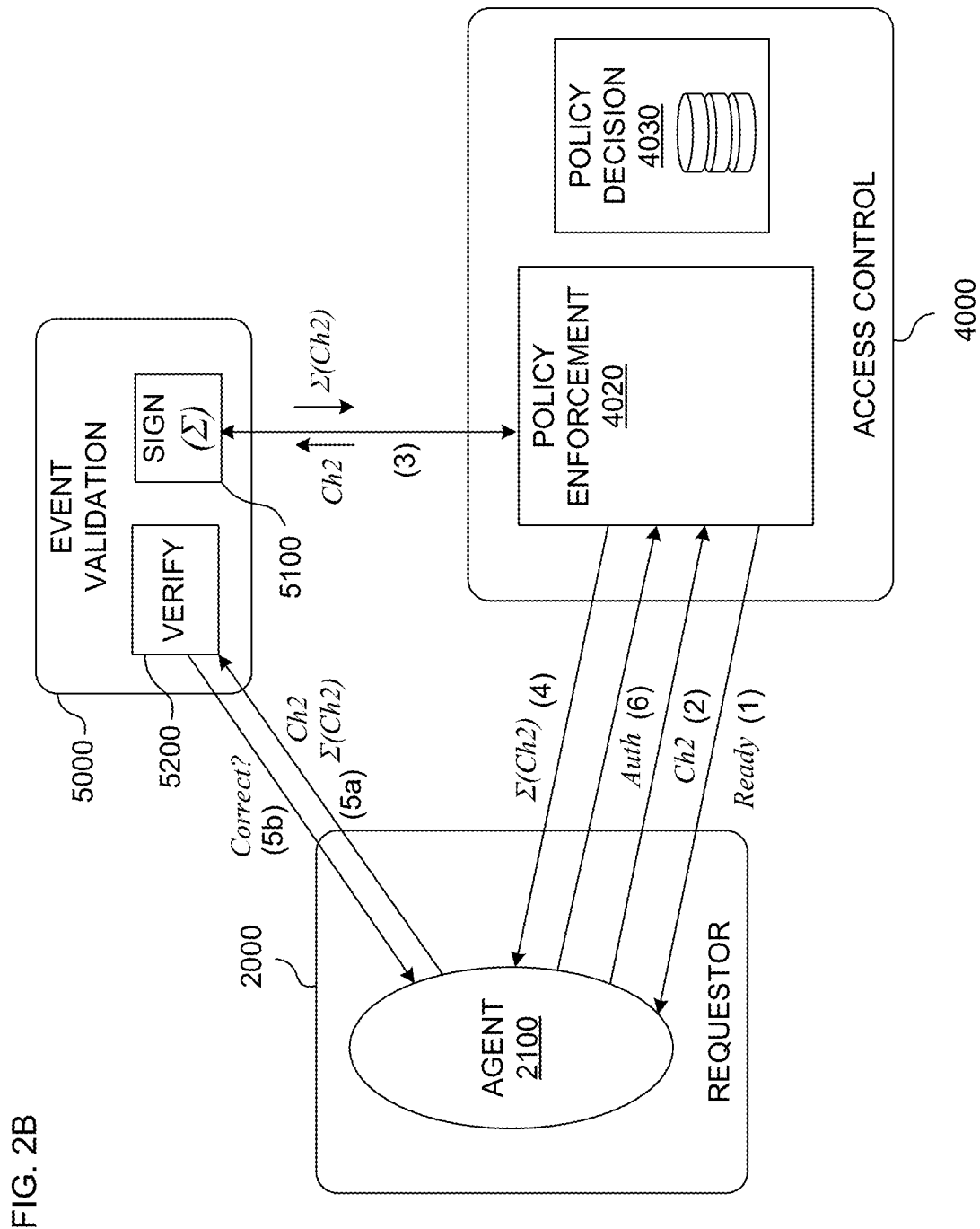
FIG. 2B illustrates a controller authorization phase of the asset access request procedure.

FIGS. 2A and 2B illustrate the components and operational steps that may be included in embodiments of the invention that include a two-way "handshake" mutual verification procedure. Depending on the implementation, some of the components and steps may not be necessary and may be omitted. In this example, the requestor 2000 is shown with an agent 2100.

Figure 2C:
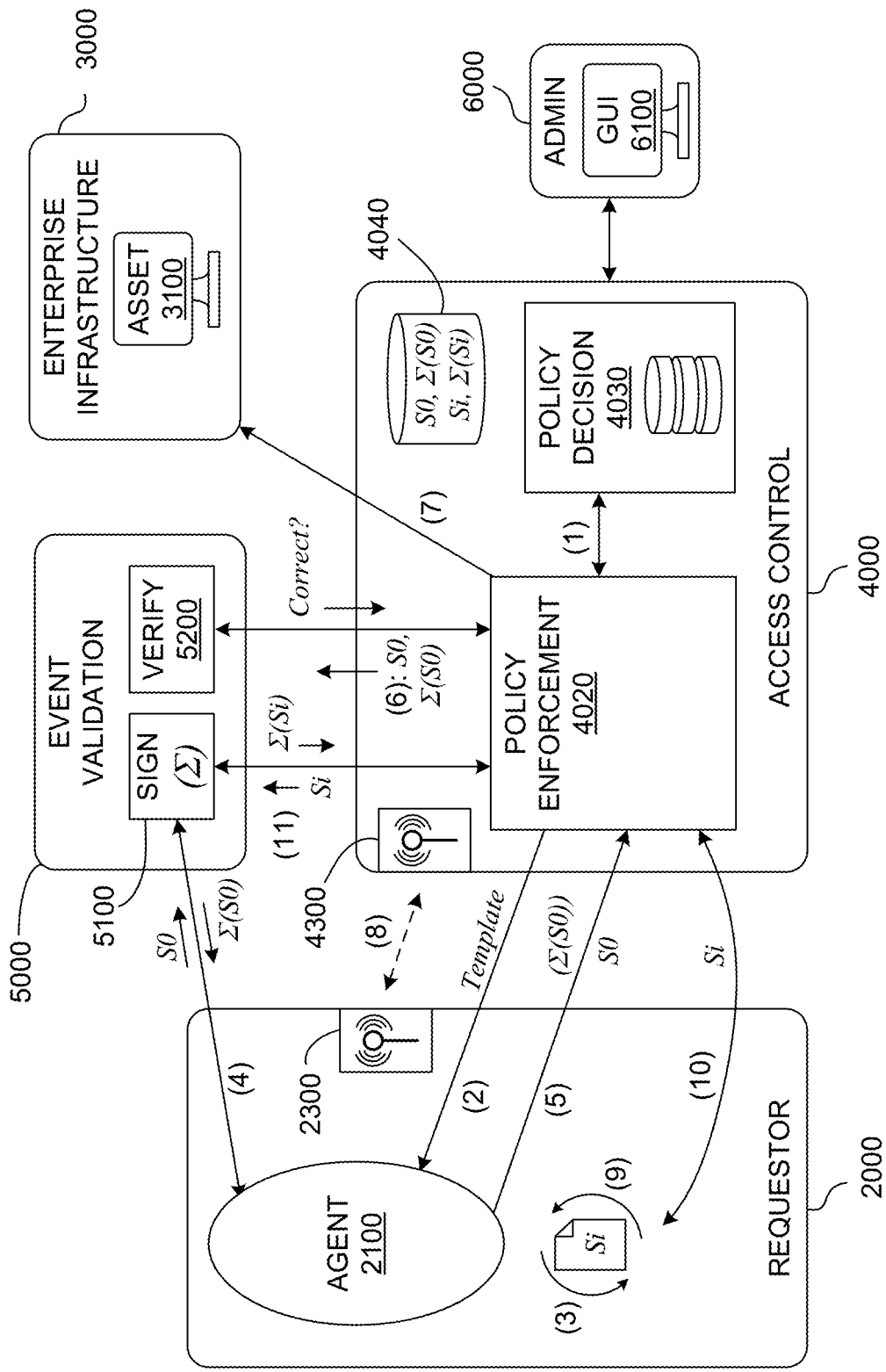
FIG. 2C illustrates an initial clearing and ongoing monitoring phase of an embodiment of an access control procedure.

Continuing with this example, assume that the requestor, in particular, its user if one is involved, wishes access to some asset 3100 within an enterprise infrastructure 3000. This infrastructure might be the secure facility 100 as in FIG. 1, such that the assets are of any type, such as those labeled 110 in FIG. 1 or, for example, a warehouse or production facility, or any other environment in which one wishes to ensure that the requestor 2000 is not doing anything unauthorized. As illustrated, access to the asset is controlled by an access control system 4000, which may be a dedicated server/software component, or be part of some other component, including the enterprise infrastructure 3000. The access control component acts as the administrative security system mentioned above. The procedural steps of FIGS. 2A-2C referred to below are shown in parentheses, that is, (1), (2), . . . , and so on.

As mentioned above, the initial "cleared", approved state S0 of the requestor 2000 should be established before the requestor is admitted to where it can request assets, and that state should be signed to get $\Sigma 0$. In some embodiments, the requestor may be "cleared" at the initial access point 105, such that its initial, approved state S0 is pre-set or extracted. The administrative system may then verify this state, for example, by obtaining a corresponding signature $\Sigma 0$ for it and storing these two values in any storage medium 4010. Optionally, the administrative system may then return the signature $\Sigma 0$ to the requestor 2000 for local storage.

In less "set" embodiments, before a user, that is, requestor, is admitted into the secure/controlled environment, the administrative system and requestor may first verify for each other that they are in fact authorized to participate in the access control procedure at all. In other words, the administrative system may wish to ensure that the requestor is even able to communicate with the access control system (if not already pre-configured or otherwise already proven to be authorized to do so), and the requestor may wish to be sure that the system clearing it for access is in fact authorized to do so.

Authentication of Requestor

See FIG. 2A, which illustrates the following steps:

(1) Under control of the agent 2100, the requestor 2000 establishes communication with the access control system 4000 and requests access.

(2) The access control system 4000, in particular, a policy enforcement module, then creates a contextual information challenge Ch1 that is returned to the agent 2100. There are many ways to create such a challenge. For example, the challenge Ch1 may include a nonce or random number, data identifying a logical or physical location, an identifier of the policy enforcement module, a serial number of the challenge, a time value, etc. As one enhancement, it would be possible to time-limit the challenge, that is, the challenge may be set to expire after n milliseconds. If the requestor fails to respond in time, then the policy enforcement module may issue a new challenge, and if the requestor fails to respond, or respond correctly, within some number in attempts, then the access control system may take any programmed action, such as notifying an administrator, locking out the requestor, etc.

(3) Implicit in the challenge Ch1 may be a requirement for the requestor to validate it using the event validation system 5000; for example, the requestor may be required to sign the challenge. Not only will this create an irrefutable record of the challenge, but it will also prove that the requestor is able and authorized to request signatures from the event validation system 5000, which may include authorization protocols of its own. In the embodiment shown in the figures, the event validation system 5000 is shown as including a signature module 5100, which creates digital signatures for received input records, and a verification module 5200, which is able to verify that purportedly unchanged data record presented to it along with a signature is in fact the same as the data record that the signature was originally created for. Other arrangements are possible, however, depending on how events are to be validated, and in some cases, such as when using the preferred signature protocol explained below, it may be possible for entities to verify data with a signature themselves, without needing to communicate with a separate system. As step (3), the requestor presents the challenge it received from the policy enforcement module to the event validation system and receives back a signature $\Sigma(Ch1)$ for the challenge.

(4) The requestor 2100 returns the signature $\Sigma(Ch1)$ of the challenge to the policy enforcement module 4020. Note that it will in general not be necessary to transmit the challenge Ch1 itself back to the policy enforcement module, since that module generated Ch1 and will have it stored and available internally.

(5a) Unless the policy enforcement module 4020 itself includes the event validation system 5000, or the signature $\Sigma(Ch1)$ itself allows for independent validation (see below), the policy enforcement module 4020 itself submits a request to the event validation system 5000, in particular, to its verification module 5200, to verify that the signature $\Sigma(Ch1)$ is correct for the given challenge Ch1. Depending on what routine the event validation module implements, this request may include either or both Ch1 and $\Sigma(Ch1)$, or any other required information.

(5b) The event validation system 5000 may then return to the policy enforcement module 4020 an indication of whether the challenge/signature was correct. If not, then the policy enforcement module 4020 may take any programmed action, such as locking out the requestor and notifying an administrator, or re-challenging the requestor, or permitting "supervised" or otherwise limited access, for example, to monitor what the requestor will do, without allowing the requestor to access or do anything malicious.

(6) At some point in the handshake procedure, even as a first step after the requestor requests access, the policy enforcement module 4020 may communicate with a policy decision module 4030, which stores general, situational access policies that apply regardless of whether a requestor is otherwise cleared for access. For example, access might be permitted only at certain times, or only for requestors whose IP addresses are from certain countries or networks, or for only a certain number of requestors at a time, etc.

(7) Assuming there are no situational access policies that would be violated and the requestor successfully responded to the challenge, the policy enforcement module may signal (Auth) to the requestor that it can be allowed access to the controlled environment.

(8) Depending on the implementation and whether both "directions" of the mutual requestor-access control system procedure are included, the access control system may clear the requestor to access the asset 3100.

Authentication of Infrastructure to Requestor

The requestor may also wish to be sure that the access control system 4000 itself is part of the authorized system. Either before, after, or even concurrently with the client-authorization procedure described above, the requestor may therefore challenge the access control system 4000 in a similar manner. See FIG. 2B.

(1) To start this phase of the handshake, if it is included at all, the access control system may signal to the requestor that it is ready. This could be the same signal as the Auth signal above, or a separate one.

(2) The requestor creates a challenge Ch2 similar to how challenge Ch1 was created, and including any data the requestor chooses to include.

(3) The access control system 4000, for example, the policy enforcement module 4020, receives the challenge and submits it to the event validation system 5000, which carries out any programmed authorization of the access control system 4000 and then, if authorized, digitally signs the challenge to create a signature) $\Sigma(Ch2)$.

(4) The policy enforcement module 4020 returns $\Sigma(Ch2)$ to the requestor. Since the requestor Ch2 created the challenge Ch2, it will typically not be necessary for the policy enforcement module to return that as well.

(5a) The requestor then submits the signature $\Sigma(Ch2)$ to the validation system 5000 for validation, unless the requestor is itself able to validate the signature internally.

(5b) The validation system signals to the requestor whether the signature was correct or not. If the signature fails to verify, then the requestor may take any desired action, from simply not proceeding with the access request, to re-challenging the access control system, to notifying a supervisory authority of the failure.

(6) If the signature $\Sigma(Ch2)$ verified, however, the requestor will know that the access control system at least is authorized to request and receive signatures (or other verification) by the event validation system, and may then signal completion of this part of the handshake procedure.

At this point, both the access control system 4000 and the requestor 2000 will have demonstrated to each other that they are in the same security environment and the requestor may be given access into the controlled environment, that is, may be allowed access to controlled assets in the enterprise infrastructure 3000.

Admitted Monitoring

Once the access control system and requestor have successfully completed the two steps of the mutual challenge-response procedure (if either is included), the approved, initial state S0 of the requestor may be determined and the requestor may be admitted into the controlled environment, if permission hadn't already been communicated earlier in the handshake procedure. In the example shown in FIG. 1, "access" may correspond to the user being let into the inner rooms, beyond the initial access point 105. See FIG. 2C, which illustrates the following example procedure:

(1) The policy enforcement module 4020 may first query the policy decision module 4030 to retrieve any specific situational access policies 4030, which an administrator 6000 may input and change via any standard user interface 6100. In some cases, for example, it may be a situational policy not to admit any requestors during some period, or more than some number of requestors at a time, etc. Situational policies might also be per-requestor. For example, a requestor might be required to access assets, or to be approved for access, or communicate with different sensors 120 in a particular order. Indications of this order may be included as parameters in the initial, approved state S0, but may also be stored within the access control system, for example in a database or other storage medium 4040 or in temporary memory, so as to be able to track the progress of the requestor and ensure that it is following the specified order and take any programmed action if it is not. Another example of the essentially limitless possible situational policies may be per-requestor and also set administratively, such as requiring per-challenge approval by one or more administrators 6000 for the requestor to continue. This could be either automated or manual. For example, in a production or supply chain or other "sequential" scenario, a supervisor (or, for example, air traffic controller, dispatcher, etc.) might be required to clear the item to proceed to the next point, which he could do by entering approval via the GUI 6100 at his location.

(2) In some embodiments, the initial, approved state S0 of the requestor 2000 will be known to the access control system. One example of this is where the requestor is pre-configured by the system administrator, is made part of the requestor manufacturing process, etc., and the requestor is issued to the user. In other cases, the policy enforcement module 4020 may pass to the requestor 2100 information defining the specific situational access policies (if included) as well as any requestor-specific, contextual information and any other data it wishes to be included as part of the requestor's approved initial state S0. In cases where the requestor is a suitable device, the policy enforcement module 4020 may also prompt the user, under control of the agent or software launched by the agent, to complete a user-ID step, such as entering a password, responding to a question, entering displayed text, etc., before proceeding with state verification.

For state verification, the policy enforcement module 4020 may pass to the agent 2100 a data template to define how it wishes the initial state vector S0 to be compiled and returned. In other words, unless already pre-determined and known to the agent 2100, the policy enforcement module 4020 may pass to the agent a template in a form, for example, Template:=({cont.}; {sit}; {p1}; {p2}; . . . ; {pn}) where {cont} is data defining the contextual policy information, {sit} is data defining any included situational policy information, and {p1} . . . {pn} are the values that are to be compiled and included by the requestor. Use of a template is not necessary. For example, depending on how events are validated, all the agent 2100 may need to send to the access control system 4000 is a data set that the agent itself defines and compiles and that can be re-compiled later during the monitoring phase. Use of a template has the advantage, however, of making the format of S0 less predictable to users of the requestor or its agent or other software within the requestor, especially if the nature or order of the elements of Template is varied from instance to instance.

(3) Under control of the agent 2100, the requestor then compiles the data set to be included in the initial state S0.

(4) The agent may then submit the initial approved state vector S0 to the event validation system 5000 to validate the vector, for example, by having it digitally signed, in which case the signature Σ(S0) may be returned.

(5) In some embodiments, as mentioned above, S0 may already be known to the access control system. In other embodiments, the agent 2100 passes to the access control system either or both of S0 and Σ(S0), depending on which the access control system doesn't already have or isn't programmed to obtain.

(6) The access control system may then validate the signature Σ(S0). Depending on how events are validated, the access control system may itself validate Σ(S0). In other embodiments, the policy enforcement module 4020 may submit either or both of S0 and Σ(S0) to the event validation system 5000, which may return an indication of whether the signature is correct or not. If it is not, then the access control system may, as before, take any pre-determined action.

(7) If the signature Σ(S0) is verified, then the policy enforcement module 4020 may authorize access by the requestor to any or all of the assets 3100 in the enterprise infrastructure.

(8) Once the requestor is within the physical or logical boundary of the controlled environment, as explained above, either on schedule, or when a wireless (NFC, Bluetooth, wifi, etc.) system 2300 in the requestor comes within range of a similar wireless system 4300 within the access control system, such as the challenge-response units 120 (FIG. 1), or upon occurrence of some other triggering event, the agent is triggered to begin a revalidation procedure.

(9) In response to the triggering event at time ti, the agent 2100 again compiles the data specified in the Template, but with the current values, to create a state value or vector Si.

(10) The requestor transmits (for example over the wireless link 2300/4300) the current state vector Si to the access control system 4000, which may then simply compare it with S0 using any chosen routine. If S0≡Si, then access control system may, for example, accept the requestor for access to a corresponding asset (for example, allow entry through a door or into a logical secure space, etc.), or may simply continue to treat the requestor as being authorized within the controlled environment. If, however S0≡Si is not true, then the access control system will know that the requestor has experienced a state change from what was approved, and the access control system may taken any programmed action, such as those described above, including denying further access, alerting a security system or personnel, "silently" allowing simulated access to see how the requestor will act, etc. Note that if S0 included the then current time t0, and t0 was used to generate Σ(S0), the access control system 4000 may need to use t0 instead of ti when evaluating if S0≡Si.

(11) The access control system may also submit the current state vector Si for validation by the system 5000, for example, by again digitally signing it. Note that, even if the state data Si is identical to S0 the submission to the event validation system may constitute a separate event worth proving. For example, in addition to Si as is, the access control system could submit a modified data set Si* which might, for example, include the current time, for example, ti, or the system time of submission, and/or an identifier of the asset the requestor wishes access to, etc. Doing so may then create an irrefutable log of requestor access events, which could be stored in a database or other storage medium 4040.

Updatable Approved State

Although the initial, approved state S0 is assumed to remain invariant during the admitted monitoring phase, it is not necessary for it to remain invariant forever. Note that the initial approval phase is repeatable: Assume that the administrative system wants the approved state S0 of the requestor to change. There might be many reasons for this. For example, the administrative system may want to allow the requestor to update some software, or change a setting, data, code, etc., that would involve a change of some element of S0, or may want to add to or delete some of the elements/parameters of S0. In such cases, the administrative system may signal the agent in the requestor to re-compile the procedure to compile the information for the new approved state S', then validates it as an event, for example, by obtaining a new "correct" signature Σ(S'), and then allowing the requestor to continue with asset access as before, but with S' as the approved state. Before allowing further access S', it would also be possible to repeat either or both of the "sides" of the mutual authentication handshake procedure described above and illustrated in FIGS. 2A, 2B.

Event Validation

Several different "events" have been described above. These include, by way of example, getting digital signatures for state data S0, Si and challenges Ch1, Ch2, etc. As mentioned above, properly digitally signing submitted data is only one possible way to create an irrefutable record of the event.

One option for validating events is to include them, or some indication of them, in a data structure that can be widely witnessed, and, as such, practically impossible to tamper with without detection. One such data structure is known as a "blockchain", as is found in some digital currency schemes such as Bitcoin. Although the term "blockchain" itself, as well as related terms, do not yet have universally accepted definitions, typically "blockchain" is understood as being a data structure comprising a series of blocks, where each block includes data corresponding to one or more transactions, hashed together with the hash output of an immediately preceding block. The chain can then be used to create a public ledger, which is typically an append-only database achieved by distributed consensus of multiple participants. Once data is entered into a block of the chain, the entry is essentially irrefutable, since any tampering with the data would be reflected in the chained hash calculations and is thus easily detected. Entering the various state values S0, Si, challenges Ch1, Ch2, as data into a blockchain block would therefore validate not only that it existed, but usually also at what time, either absolutely, depending on the blockchain, or at least relative earlier or later blocks. In embodiments that use a blockchain as the event validation system 5000, digital signatures may not be needed at all, but rather the blockchain can be queried to determine the presence of the respective events.

Another form of event validation may use a public-private key exchange, backed by digital certificates issued by a certificate authority (CA). In other words, it would be possible to validate events of various embodiments using a PKI-type scheme. Some of the disadvantages of such an arrangement include the need to securely store possibly large numbers of key pairs, the need to rely on the integrity of the certificate authority, the possibility that the keys may expire, etc. In short, a key-based approach requires maintaining at least one "secret" in each system pair that communicates, as well as reliance on (in most cases) a third-party CA.

The distributed, hash tree-based signing infrastructure provided by Guardtime AS of Tallinn, Estonia, overcomes many of the problems associated with key-based schemes, and further provides a level of computational independence that public blockchains lack. In broadest terms, for a given digital input record (such as the state data S0, Si, Ch1, Ch2, etc.), which may have essentially any composition, the Guardtime returns a digital signature that enables data verification through recomputation of a logically uppermost value in a hash tree. Given a purportedly authentic copy of the input record together with the data signature, an entity using the Guardtime infrastructure can then verify that the document is authentic by recomputing the uppermost hash tree value using the digital signature and the input record itself (or some function of the data defining the input record). The Guardtime digital signature may also automatically encode not only a substantially irrefutable representation of the input record, but also, in practice, almost any additional parameters a user chooses, such as the time at which the input record was originally signed.

Hash Tree-Based, Keyless Signature Infrastructure

Figure 3:
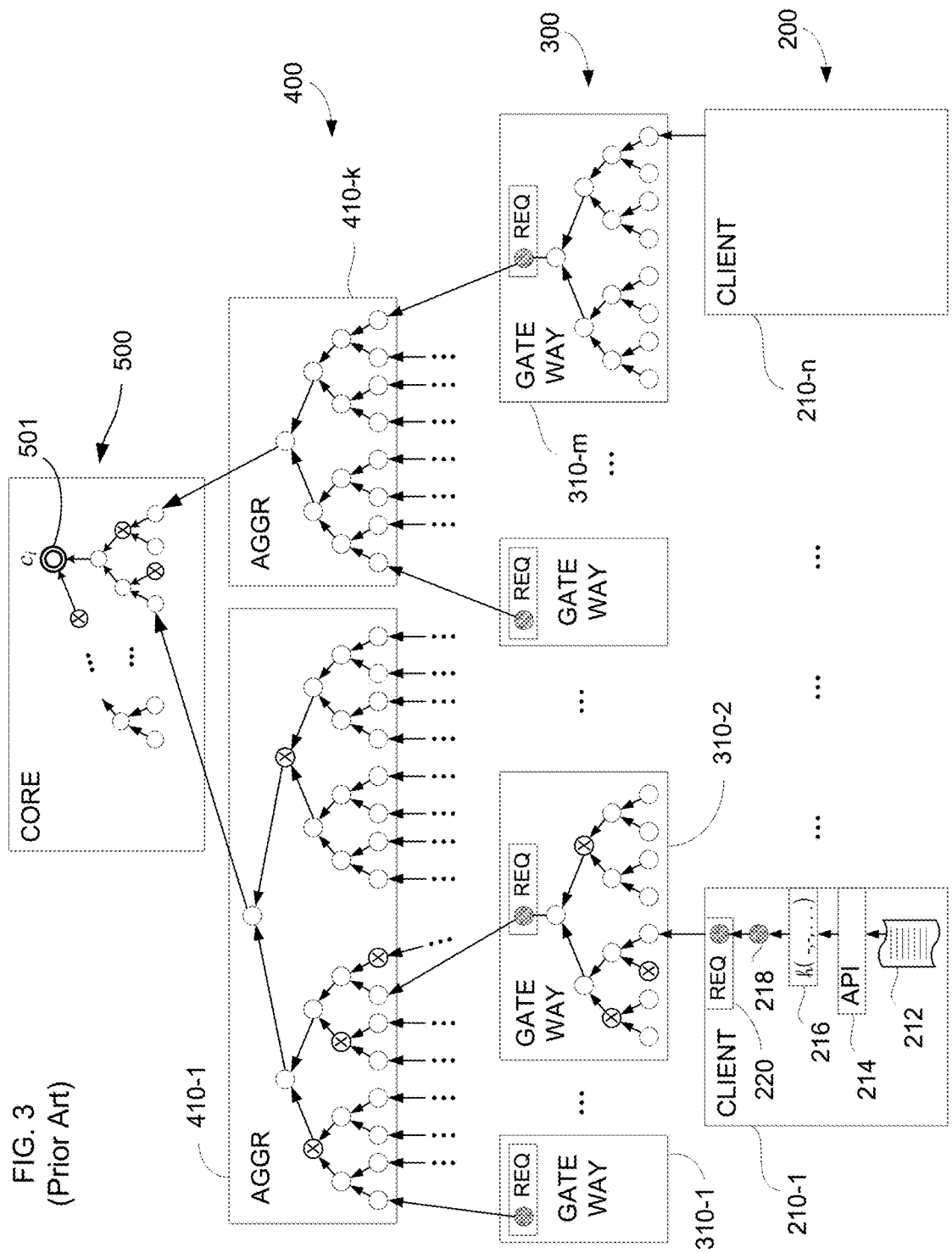
FIGS. 3 and 4 illustrate a distributed hash tree-based data signing infrastructure.

FIG. 3 illustrates the hash tree infrastructure (the "Guardtime signing infrastructure") that has been developed by Guardtime As of Tallinn, Estonia, and which is disclosed in U.S. Pat. Nos. 8,347,372; 8,312,528; and 7,698,557 (all Buldas, et al., "System and method for generating a digital certificate") as well as U.S. Pat. No. 8,719,576 (also Buldas, et al., "Document verification with distributed calendar infrastructure"), all of which are incorporated herein by reference. In short, the hash tree infrastructure of Bildas '576 may be used to function not only as the event system 5000, but also as a timestamping system too, for any of a plurality of "clients", including the users' devices, acting as requestors 2000. Just for the sake of completeness, the main features of the Guardtime signing infrastructure are summarized here, with reference to FIGS. 3 and 4.

The general Guardtime infrastructure has several different layers: a client or user layer comprising a number of client systems; a layer of gateways 300; a layer including one or more aggregation systems 400; and an uppermost layer 500 that includes a "core". Typically, the gateways, aggregators and the core will be servers, with known network connections and network communication hardware and software. In some implementations, some or all of the gateways may also perform the functions of aggregators, and in some other implementations, gateways may incorporate or even be one or more of the clients.

In FIG. 3, various clients are represented as 210-1, . . . , 210-n; gateways are represented as 310-1, 310-2, . . . , 310-m; and two aggregators are shown as 410-1, 410-k. An aggregator will typically communicate into a respective one of the lowest level hash tree nodes within the core, as described in more detail below. Only two aggregators are shown in FIG. 3 for the sake of simplicity.

Each client system 200 that wishes to use the infrastructure may be loaded with a software package or internal system routines for convenient or even automatic communication and submission "upwards" of digital information. Note that it is not necessary (although it is possible) to submit the entire "raw" contents of a digital record for signature. Rather, the transformation may entail some form of compression such as a hash, including a cryptographic hash. This has at least two advantages. First, if a digital input record, has sensitive contents, it is not necessary to transmit them over the network and expose it to interception en route, or to reveal the contents outside of the client system itself. Second, it makes it possible to sign even large files without having to transmit such large files over the network.

The data structure of a binary hash tree is illustrated within the gateway 310-2. The lowest level nodes of the gateway hash tree will correspond to the transformed data set 218 submitted as a request REQ from a client/user, along with any other parameters or data used in any given implementation to form a request. In embodiments of this invention, the state data sets S0, Si, challenges CH1, Ch2, etc., may be either the input records 212 themselves, or may directly comprise requests 220, as long as they are properly formatted.

As illustrated, the values represented by each pair of nodes in the data structure form inputs to a parent node, which then computes a combined output value, for example, as a hash of the two input values from its "children" nodes. Each thus combined output/hash value is then submitted "upward" as one of two inputs to a "grandparent" node, which in turn computes a combined output/hash value for these two inputs, and so on, until a single combined output/hash value is computed for the top node in the gateway.

Aggregators such as the system 410-1 similarly include computation modules that compute combined output values for each node of a hash tree data structure. As in the gateways, the value computed for each node in the aggregator's data structure uses its two "children" nodes as inputs. Each aggregator will therefore ultimately compute an uppermost combined output value as the result of application of a hash function that includes information derived from the digital input record(s) of every client that submitted a request to a gateway in the data structure under that aggregator.

In many cases, the core 500 is maintained and controlled by the overall system administrator. In the context of embodiments of this invention, this need not be the same as the system that controls the access control system 4000, although this is possible. One advantage of this is that documents being verified for users will receive signatures that encode information from other, unrelated digital records as well, from completely independent sources, which then will make it in practice impossible to create fake signatures.

Within the core, a hash tree data structure is computed using the root hash values of the aggregators as lowest level inputs. In effect, the hash computations and structure within the core form an aggregation of aggregation values. The core will therefore ultimately compute a single current uppermost core hash value at the respective tree node 501 at each of a sequence of calendar time intervals t0, t1, . . . , tn. This uppermost value is referred to here alternatively as the "calendar value" $c_i$ or "current calendar value" for the time interval ti. If calendar values are computed according to precisely determined time values, such as one calendar value each 1.0 s, then each calendar value will also be a precise representation of time. In short, each digital signature issued in a given calendar interval will intrinsically and provably be tied to a particular calendar value, which may in turn be uniquely associated with a time value to the precision of the calendar period. Due to the essentially non-invertible nature of cryptographic hash functions, this time association will be as essentially impossible to fake as the data that led to the corresponding signature itself.

Note that the uppermost tree node 501 represents the root node of the entire tree structure of nodes junior to it. This will change upon recomputation of a new uppermost core hash value at the end of the next period of accumulating requests and generating signature vectors (also referred to as "data signatures") containing recomputation parameters. In one configuration of the Guardtime signature infrastructure, the core system 500 combines the sequence of calendar values $c_i$ during each of a series of time intervals ("calendar periods") $T_p$ using a Merkle hash tree to form a combined uppermost hash value, which will encode information from every calendar value, and thus every digital input record, ever submitted to the infrastructure for signature up to the end of the current calendar period. Periodically, the combined uppermost hash value may then be published in some substantially unalterable medium, such as a newspaper, publicly accessible database or web site, some internal database or publication (such as within an enterprise or government agency), or even in a ledger such as a blockchain, etc., such that, once the value is published, it would be practically impossible to fraudulently alter what was published. In many, if not most, cases, however, the level of assurance provided by recomputation to the calendar value within a signature may be adequate; indeed, in practice, the level of assurance provided by Guardtime signatures is at least as good as PKI-based systems provide, even without publication, which is thus an optional feature.

Figure 4:
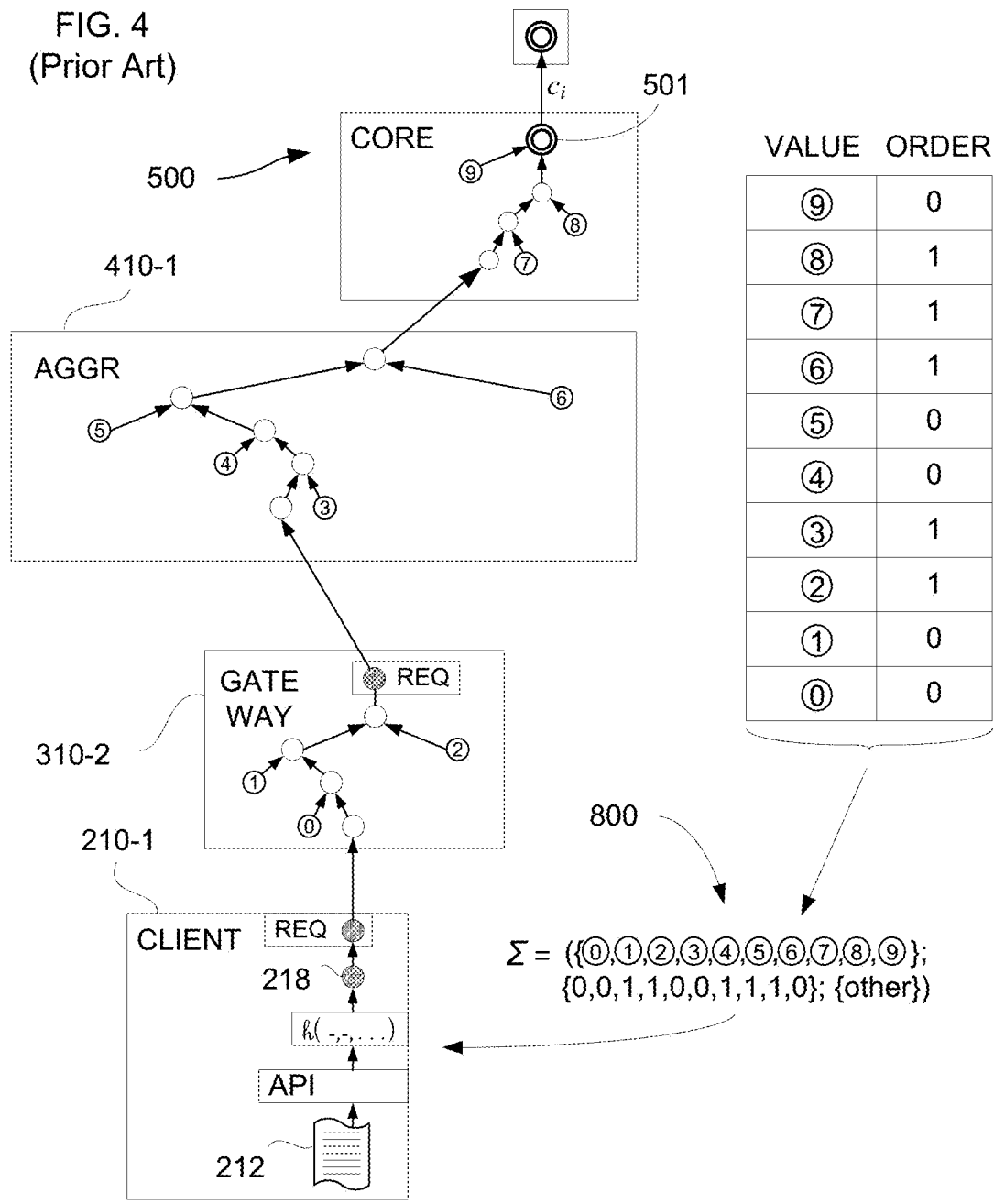

In FIG. 4, certain ones of the hash tree nodes in the gateway 310-2, the aggregator 410-1, and the core 500 are numbered 0-9. Notice if one traverses the various tree paths upward from the value 218 in the client 210-1, it is possible to compute every value upward in the tree structures all the way to the most current uppermost core value 501 given the values in the numbered tree nodes (the "siblings" of the nodes in the direct recomputation path) and a knowledge of the hash functions applied at each successive parent node. In short, if a signature is associated with the digital record 212 that includes all of the "numbered" values, and assuming predetermined hash functions, then re-computation of the hash values upward through all of the tree structures will yield the same value as in the current calendar value, but only if the starting input value representing the original digital record, plus any additional parameters that were included, is identical in every respect to the original. Even the slightest alteration to the digital input record or even a change of a single bit in any of the values of the signature associated with a record 2012 will lead to a re-computed calendar value that is not identical to the one in node 5001. In short, any change, no matter how small, in a document will lead to a failure of recomputation, that is, a verification failure.

The set of sibling hash values, along with any other information such as order (such as "left"/"right", since most cryptographic hash functions are not commutative), that enable recomputation of the corresponding calendar value, may then be returned to the client system as the signature $\Sigma$ (800, FIG. 4) for the digital input. If publication is implemented as an additional level of assurance, this signature may later be extended with the sibling values within the core's Merkle hash tree that allow recomputation all the way up through the infrastructure to the uppermost, published hash value.

Assume now by way of example that some entity later wishes to verify that a digital record in question—a "candidate digital record" or "candidate document"—is an identical copy of digital record 212. Let Cal($\delta$) be the calendar value obtained by recomputing from digital input (document) $\delta$ up to the calendar value included in the digital signature associated with the original $\delta$. Applying the same transformation function 216 to the candidate digital record and recomputing upward using the corresponding data signature, the entity should compute to the exact same calendar value Cal($\delta$) (or publication value) that resulted from the original digital record's request.

Applying this signature solution in the context of this invention, assume that signature $\Sigma 0=\Sigma 0(S0)$ was computed for S0, and computes to a calendar value c(t0), where t0 is the time at which $\Sigma 0$ was computed. If, later during the monitoring phases, the requestor submits a state data set Si, then the values in $\Sigma 0$, with Si as the input record instead of S0, should recompute to the same calendar (or publication) value c(t0). If it does not, then the access control system will know that Si≠S0, that is, that the requestor is no longer in the initial, approved state S0. Notice that recomputation of a calendar value (which is included in the signature) does not require reference to an external system to do the recomputation and verification; rather, as long as the hash functions are known (and are typically the same standard hash function, such as one of the SHA cryptographic hashing algorithms), the recomputation and verification can be done within the access control system 4000 itself.

System Implementation

Figure 5:
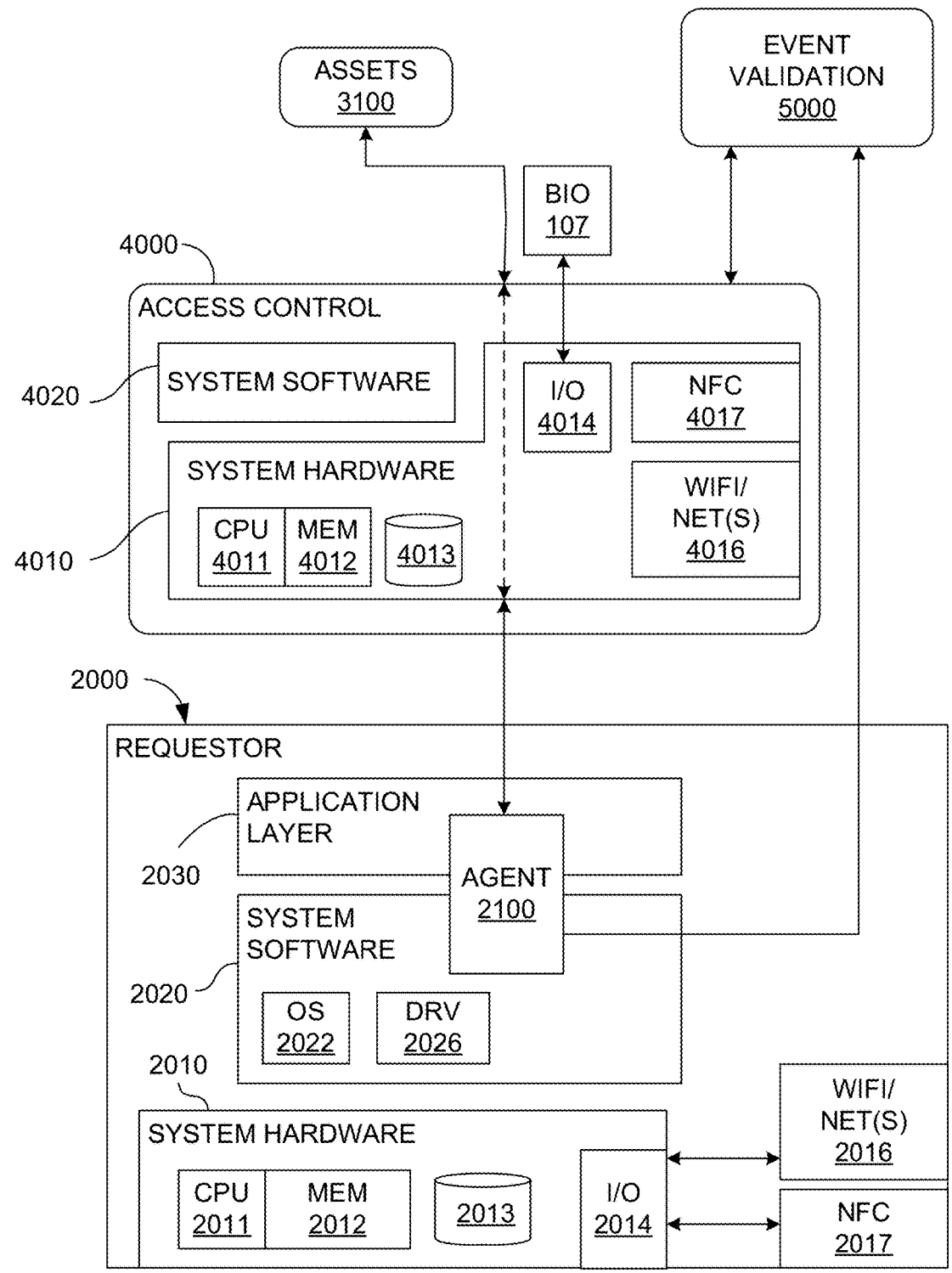
FIG. 5 illustrates the main hardware and software components of a device, as well as its interaction with other systems.

FIG. 5 illustrates a representative system that implements embodiments. The various computational and other data-processing steps described above, and illustrated in general in FIGS. 1-2C, are carried out by executing appropriate modules of computer-executable code that may be stored, that is, embodied, in any conventional non-transitory medium and will be loaded into the system memory of each system 2000, 3000, 4000, 5000 for execution by the respective system processor(s). Although several modules are shown as being separate in the figures, it would also be possible to combine some or all of them into single bodies of code within each respective system, which may then be loaded as a unit.

As FIG. 5 illustrates, the requestor 2000 will generally include one or more processors 2011 within a system hardware layer 2010, along with system memory 2012 and, depending on the requestor, at least one non-volatile storage device 2013, which may be of any type or configuration. Circuitry 2014 to carry out various I/O operations will also generally be included in the hardware platform, and may communicate with either built-in or peripheral wireless communications circuits using, for example, wifi, network, NFC or other technologies 2016, 2017, any one or more of which may be used to implement the component(s) 2300.

The requestor 2000 will also include some form of system software 2020, generally including an operating system 2022 and any drivers 2026 needed, for example, to interact with peripheral devices such a display, touchscreen, etc. Applications in an application layer 2030 run on the hardware under the control of the system software. The agent 2100 may be installed either at the application level 2030, or as part of the system software 2020, or may have components within both layers. Depending on the nature of the requestor, it would also be possible to include the processor-executable code that defines the agent 2100 in firmware, or even within an architected and therefore more secure hardware component, such as a dedicated read-only memory chip.

The access control system 4000 will include similar and well-known system hardware 4010 and system software 4020 components, including one or more processors 4011, as well as memory 4012 and non-volatile storage 4013, one or more I/O units 4014 to communicate with peripherals, input and send data, etc., wireless or other communications technologies 4016, 4017 compatible with those in requestors to enable challenge triggering and data transfer to and from the requestors, etc. In implementations that incorporate biometric information about users, either for initial system validation or later on-going monitoring, an appropriate biometric scanner 107, such as for fingerprints, retinal scanning, voice recognition, etc., may be included as one such peripheral, or may be included as a component of the access control system itself; many modern computers have built-in fingerprint scanning capability, for example.

The memory and/or storage will store processor-executable code that embodies its components, such as the policy enforcement and policy decision modules 4020, 4030. The code itself may be pre-loaded, downloaded from an external source, input from a portable storage medium such as a disk, thumb drive, etc.

Logical Requestors

In some implementations, the requesting entity 2000 could be, in essence, purely logical, that is, a body of executable code, although, of course, even it will need to be embodied in some storage medium that enables it, or a virtual machine on which it is loaded, to be executed by a hardware processor. The asset may also be purely logical.

As one example, assume that the requesting entity, that is the requestor 2000, is a browser and that the asset it wishes access to is a network asset such as a web site, remotely executable application, cloud storage system, site from which to download data or software, etc., that is hosted on or accessed via a server. Conversely, assume that a remote site tries to communicate with a user's email service, browser or computer, for example, by sending email. As it stands now, to combat the many variations of malicious internet-related activities, from phishing attacks to spam to the various other forms of identity theft, users must rely, at best, on such techniques as personally typing in the known correct URL, or using spam and malware filters, or on the assumption that the communication is "secured" by a digital certificate and keys as in PKI-based security protocols. As is all too well known, most of these schemes to protect users, or hosting servers, often fail.

The two-way challenge-response procedure described above (or either "side" of it) may be used in such cases as well to increase security. Just by way of example, assume that the requesting entity 2000 is a browser, the asset 3100 it wishes to access is a web site, and the access control system 4000 is a server that is hosting the web site. Assume further that event validation is done using signatures of the type illustrated in FIGS. 3 and 4. Other use cases, such as those mentioned above, and event validation schemes may be implemented similarly and will be readily understandable to skilled system programmers. The mutual ("handshake") authentication procedure may be used as follows, and as is schematically illustrated in FIG. 6.

Figure 6:
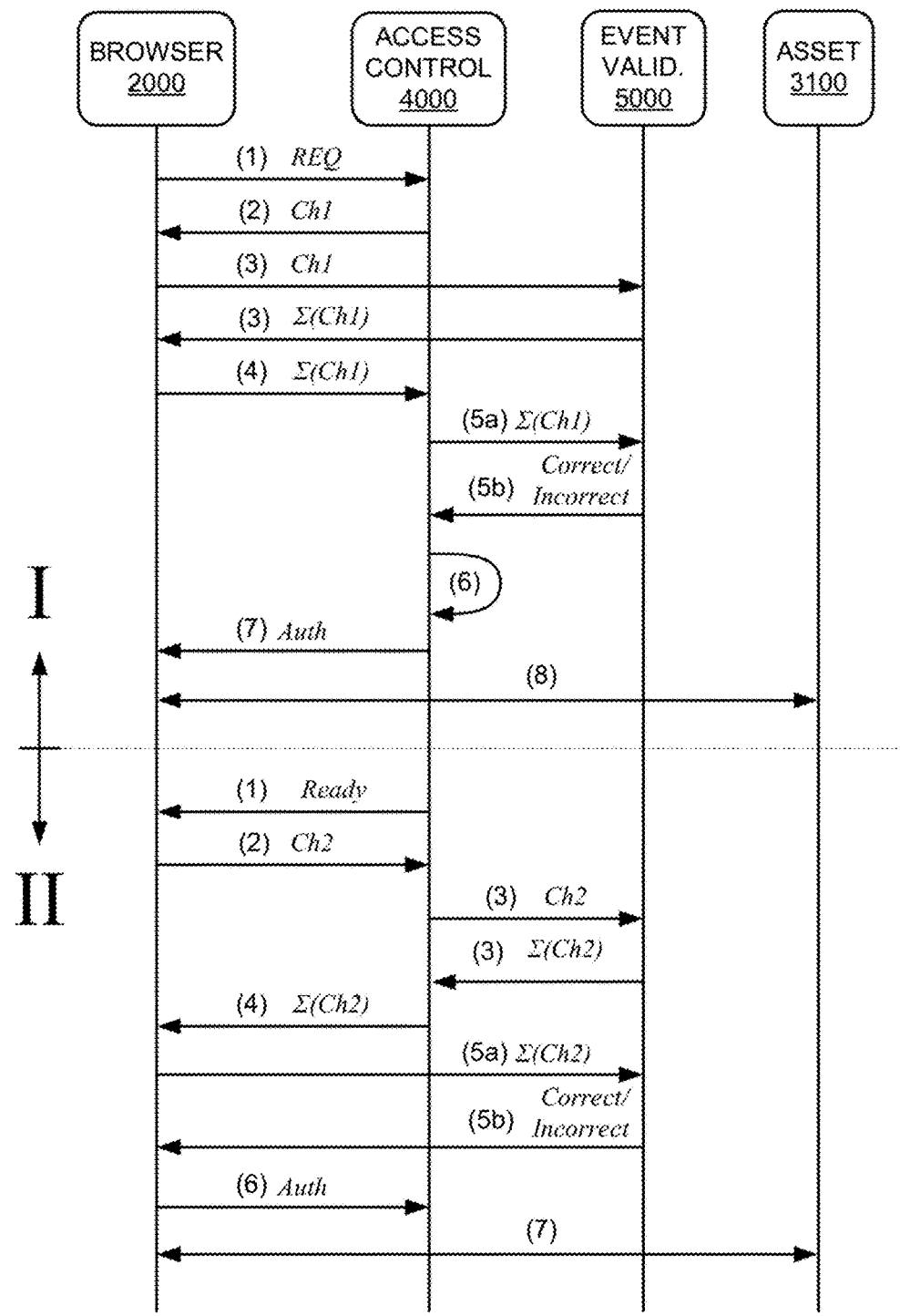
FIG. 6 is a flow diagram of a mutual challenge procedure.

Authentication of Requestor (Section I of FIG. 6)

(1) The browser establishes communication with the server, and requests access, for example, but submitting a URL or other identifier.

(2) The sever sends challenge Ch1 to the browser.

(3) The browser contacts the event validation system 5000 to get a signature $\Sigma(Ch1)$ for the challenge Ch1.

(4) The browser returns the signature $\Sigma(Ch1)$ of the challenge to the server.

(5a) Unless the server itself is configured to verify signatures, it also contacts the event validation system 5000 to verify that the signature $\Sigma(Ch1)$ is correct for the given challenge Ch1

(5b) The event validation system 5000 may then return to the server an indication of whether the challenge/signature was correct. If not, then the server may take any programmed action, such as denying access, notifying an administrator, re-challenging the requestor, etc.

(6) At some point in the procedure, even as a first step after the browser requests access, the server may either check its internal policy decision module 4030 (which may simply be entered by the administrator) or query an external policy decision module to see if there are any general, situational access policies that might preclude access to the requested site.

(7) Assuming there are no situational access policies that would be violated and the browser successfully responded to the challenge, the server may (if needed) send the browser whatever signals or data typically exchanged before actually allowing access.

(8) Depending on the implementation and whether both "directions" of the mutual browser-server procedure are included, the server may clear the requestor to access the asset, which may include downloading to the browser the code (such as html) defining the requested web site, requested data, etc.

Authentication of Server (Section II of FIG. 6)

The browser may also wish to be sure that the server itself is part of the authorized system and not part of a "phishing" or similar scam. Either before, after, or even concurrently with the browser-authorization procedure described above, the browser may therefore challenge the server in a similar manner:

(1) To start this phase of the handshake, if it is included at all, the server may signal to the browser that it is ready. This could be like the Auth signal above, or a separate one.

(2) The browser creates a challenge Ch2 similar to how challenge Ch1 was created, and including any data the browser chooses to include.

(3) The server receives the challenge and submits it to the event validation system, which carries out any programmed authorization of the server and then, if authorized, digitally signs the challenge to create a signature $\Sigma(Ch2)$.

(4) The server returns $\Sigma(Ch2)$ to the browser. Since the browser Ch2 created the challenge Ch2, it will typically not be necessary for the server to return that as well.

(5a) The browser then submits the signature $\Sigma(Ch2)$ to the validation system for validation, unless the browser is itself able to validate the signature internally.

(5b) The validation system signals to the requestor whether the signature was correct or not. If the signature fails to verify, then the browser may take any desired action, from simply not proceeding with the access request, to re-challenging the server, to notifying a supervisory authority of the failure, since it might indicate that the server is potentially compromised or malicious.

(6) If the signature $\Sigma(Ch2)$ verified, however, the browser will know that the server at least is authorized to request and receive signatures (or other verification) by the event validation system, and may then signal completion of this part of the handshake procedure.

(7) If the server has been verified, the browser (if it too has been verified, if phase I is included) may then communicate with the asset.

At this point, both the server and the browser will have demonstrated to each other that they are authorized to participate in the same security environment, in the sense that both are able to obtain event validation (entering blocks into a blockchain, getting signatures, etc.) and the browser may be given access into, or accept content from, the requested asset, such as a web site.

The access request that a requesting entity makes does not have to be only to receive something from the asset; rather, the access request could be for the purpose of sending or even transforming data, for example, for storage in a particular storage system, or to move data objects from one classification level to another, etc. In some such implementations, the "requestor" could in a sense therefore be one or more data objects that are to move within a multi-point data environment. The initial state S0 could in such cases be the state of the data objects themselves.

As can be understood from the description and examples above, and from FIGS. 2A, 2B, and 6, the mutual verification "handshake" procedure concepts of "requesting entity" and "access control system"/server are in some cases "reversible". Consider, for example, the case of a pop-up message from a remote site on a user's mobile phone, a message that the user isn't sure is safe to click on. In such a case, the mobile device, that is, its operating system, memory, etc., are "assets" that the remote site wants access to, for example, to push software down to, or to send data to. In other words, the software within the mobile device could be the access-controlling entity, and the remote site, that is, any server acting to transmit its request for action by the mobile device, would be the "requesting entity". This configuration could be used not only to prevent inadvertent downloading of malicious software, but also of malicious data, such as false navigation signals, authorization codes, or any other of the essentially countless types of fraudulent or otherwise malicious information that third party entities now try to get into user and other devices.

Path-Specified Verification

Some forms of event validation encode not only data that is submitted for verification, but also information regarding the server path the data took to get to the validation system. For example, some blockchain block schemes may include, in addition to the data itself or some representation of the data, data that identifies the entity that submitted the data block, or of one or more intermediate servers between the requesting entity and the blockchain.

U.S. Published Patent Application 2015/0039893 A1 (Buldas, et al., also assigned to Guardtime) builds on the signing infrastructure illustrated in FIGS. 4 and 5 by having one or more of the servers in the gateway and aggregation layers create an "ID" hash tree leaf as a final "sibling" value for its uppermost hash sub-tree. The ID leaf contains an identifier of the respective node, that is, typically, the server that implements its inter-server communications and hashing computations. In other words, a server ID value will be a value in every signature that is created for digital input records whose recomputation tree passes through the respective server.

If such a signing infrastructure is used for event verification, or some other path-encoded validation, the path could be specified as part of the challenge Ch1 and/or Ch2. In other words, the entity issuing a challenge could require validation of that challenge using a wholly or at least partially specified path, such as submission via a particular server, or that will participate in the creation of the digital signature for the challenge. For example, the access-controlling entity might require the requestor to obtain any signatures only from particular servers, or, for example, only from a gateway or aggregator located in a particular geographic region. In the case of a Guardtime-type distributed hash tree infrastructure with ID node augmentation, as in the Buldas '893 application, more than one server in the path from input to the core could be specified, assuming the servers in that path are known to include their "ID leaves". This would in many cases greatly increase the integrity of the mutual challenge procedure, since a hacker would need to compromise all of the specified servers in the challenge-specified signature path in order to defeat the challenge procedure. Not only would this be very difficult if the servers are known in advance of the challenge, but in some cases they may not be known until the time the challenge is issued (especially if the challenging entity can choose different paths), requiring even more severs—which may be widely distributed and under the control of different enterprises—to be attacked successfully in order to compromise the challenge procedure.

The invention claimed is:

1. A method for controlling access by a requesting device to an asset, comprising:
    defining an approved state of the requesting device;
    obtaining from an event validation system a validation of a representation of the approved state as a non-repudiatable data signature that encodes at least one approved internal state parameter of the device;
    triggering, by an access control system, the requesting device to determine at least one current state value of said requesting device, and to transmit the at least one current data value to the access control system;
    comparing the current state with the approved state by determining if the data signature, when evaluated using the at least one current data value, is identical to the data signature that encodes the at least one approved internal state parameter; and
    allowing access by the requesting device to the asset only if the current state is the same as the approved state.

2. The method of claim 1, in which the event validation system is a widely witnessed blockchain and the non-repudiatable data signature is an entry of the representation of the approved state into the blockchain.

3. The method of claim 1, further comprising triggering the requesting device to determine the at least one current state value repeatedly, according to a pre-determined schedule.

4. The method of claim 1, further comprising triggering the requesting device to determine the at least one current state value upon sensing a signal transmitted by the requesting device.

5. The method of claim 1, further comprising:
    defining an updated state for the requesting device having a plurality of updated state parameters;
    causing the requesting device to evaluate the updated state parameters;
    obtaining from the event validation system a validation of a representation of the updated state as an updated, non-repudiatable data signature; and
    setting the updated state to be the approved state.

6. The method of claim 1, further comprising, before triggering the requesting device to determine the current requesting device state, initially authenticating the requesting device by:
    transmitting to the requesting device a challenge data set;
    receiving from the requesting device a response corresponding to a representation of the challenge data set in the form of a non-repudiatable data signature, obtained from the event validation system; and
    determining if the response is correct for the challenge data set and initially authenticating the requesting device only if the response is correct.

7. The method of claim 1, further comprising, before triggering the requesting device to determine a current requesting entity state:
    receiving from the requesting device a challenge data set;
    obtaining a representation of the challenge data set from the event validation system in form of a non-repudiatable data signature;
    transmitting to the requesting device the non-repudiatable data signature;

triggering the requesting device to determine its current state only if the requesting device has determined that the response is correct for the challenge data set.

8. The method of claim 1, in which the asset comprises a sequence of access points, further comprising
triggering the requesting entity to determine the current state when the requesting device reaches each access point; and
allowing access by the requesting device to a subsequent access point only if its current state has been the same as the approved state at a previous access point.

9. The method of claim 8, in which the requesting device is a device associated with an item in a production or supply chain.

10. The method of claim 1, in which the requesting device is a mobile device.

11. The method of claim 10, in which the mobile device is a smart phone, tablet computer or portable computer.

12. The method of claim 10, in which the mobile device is a vehicle and the asset is entry into a physical region.

13. The method of claim 1 in which the requesting device is virtualized in the form of a body of executable code.

14. The method of claim 13, in which the asset is digital information stored in at least one server.

15. The method of claim 1, further comprising including in the approved state at least one value generated external to the requesting device.

16. The method of claim 1, further comprising:
generating an invariant representation of at least one biometric value of a user of the requesting device; and
including the invariant representation as an element of the approved state.

17. A system for controlling access by a requesting device to an asset, comprising computer-executable code embodied in a non-volatile medium, said code causing a processor within an access-control entity to:
define an approved state of the requesting device;
obtain from an event validation system a validation of a representation of the approved state as a non-repudiatable data signature that encodes at least one approved internal state parameter of the device;
trigger the requesting device to determine at least one current state value of said requesting device and to receive the at least one current data value from the requesting entity;
compare the current state with the approved state by determining if the data signature, when evaluated using the at least one current data value, is identical to the data signature that encodes the at least one approved internal state parameter; and
allow access by the requesting device to the asset only if the current state is the same as the approved state.

18. The system of claim 17, in which the event validation system is a widely witnessed blockchain and the non-repudiatable data signature is an entry of the representation of the approved state into the blockchain.

19. The system of claim 17, in which the access-control entity triggers the requesting device to determine the current state repeatedly, according to a pre-determined schedule.

20. The system of claim 17, further comprising computer-executable code causing the processor to trigger the requesting device to determine the current state ($S_i$) upon sensing a signal transmitted by the requesting device.

21. The system of claim 20, further comprising a wireless transmission/reception unit in communication with the requesting device, whereby the requesting device is triggered to determine the current state upon coming within a range of the wireless transmission/reception unit.

22. The system of claim 17, further comprising computer-executable code that causes the processor:
to define an updated state for the requesting device having a plurality of state parameters;
to cause the requesting device to evaluate the state parameters;
to obtain from the event validation system a validation of a representation of the updated state in the non-repudiatable form; and
to set the updated state to be the approved state.

23. The system of claim 17, which, before triggering the requesting device to determine the current requesting device state, initially authenticates the requesting device by:
transmitting to the requesting device a challenge data set;
receiving from the requesting entity device a response corresponding to a representation of the challenge data set in the non-repudiatable form, obtained from the event validation system; and
determining if the response is correct for the challenge data set and initially authenticating the requesting device only if the response is correct.

24. The system of claim 17, further configured, before triggering the requesting device to determine a current requesting device state:
to receive from the requesting device a challenge data set;
to obtain a representation of the challenge data set from the event validation system in the non-repudiatable form;
to transmit to the requesting device the representation of the challenge data set in the non-repudiatable form;
to trigger the requesting device to determine its current state only if the requesting device has determined that the response is correct for the challenge data set.

25. The system of claim 17, in which the asset comprises a sequence of access points, in which the access-control entity is further configured
to trigger the requesting device to determine the current state when the requesting device reaches each access point; and
to allow access by the requesting device to a subsequent access point only if its current state has been the same as the approved state at a previous access point.

26. The system of claim 25, in which the requesting device is a device associated with an item in a production or supply chain.

27. The system of claim 17, in which the requesting device is a mobile device.

28. The system of claim 27, in which the mobile device is a smart phone, tablet computer or portable computer.

29. The system of claim 27, in which the mobile device is a vehicle and the asset is entry into a physical region.

30. The system of claim 17, in which the requesting device is a body of executable code.

31. The system of claim 30, in which the asset is digital information stored in at least one server.

32. The system of claim 17, in which the approved state includes at least one value generated external to the requesting device.

33. The system of claim 17, further comprising:
means for generating an invariant representation of at least one biometric value of a user of the requesting device; and in which the approved state includes the invariant representation.

* * * * *